United States Patent [19]
de Jong et al.

[11] Patent Number: 5,809,780
[45] Date of Patent: Sep. 22, 1998

[54] HYDRAULIC CONTROL VALVE

[75] Inventors: Leendert Willem C. de Jong, Oldenzaal; Arjan Peter van Heiningen, Haaksbergen; Willem Herman Masseling, Oldenzaal, all of Netherlands

[73] Assignee: Applied Power Inc., Butler, Wis.

[21] Appl. No.: 592,388

[22] PCT Filed: Nov. 1, 1994

[86] PCT No.: PCT/NL94/00267

§ 371 Date: Feb. 1, 1996

§ 102(e) Date: Feb. 1, 1996

[87] PCT Pub. No.: WO95/12777

PCT Pub. Date: May 11, 1995

[30] Foreign Application Priority Data

Nov. 1, 1993 [NL] Netherlands .......................... 9301875

[51] Int. Cl.$^6$ .............. F16D 31/02; F16K 31/53
[52] U.S. Cl. ............ 60/472; 60/433; 137/625.21; 251/249; 251/250.5; 251/313
[58] Field of Search ............. 137/625.21; 251/248, 251/249, 250.5, 313; 60/433, 472

[56] References Cited

U.S. PATENT DOCUMENTS

| | | | |
|---|---|---|---|
| 536,119 | 3/1895 | Ansbary | 251/250.5 |
| 554,111 | 2/1896 | Conti | 251/249 X |
| 1,719,693 | 7/1929 | Hans Ernst | 417/429 |
| 2,690,894 | 10/1954 | Blevans | 251/250.5 X |
| 2,925,095 | 2/1960 | Bates | 251/313 X |
| 3,587,234 | 6/1971 | McQueen | 60/472 X |
| 4,120,202 | 10/1978 | Range et al. | 73/421 R |

FOREIGN PATENT DOCUMENTS 2384133  3/1978  France .

*Primary Examiner*—John Rivell
*Attorney, Agent, or Firm*—Quarles & Brady

[57] ABSTRACT

A hydraulic control valve has a two position body shifted by rotation. The shaft of the valve body carries a drive wheel segment extending through an arc that corresponds to the shift angle of the valve. A spring is provided to bias, at least in the final stage of rotation in either direction, the wheel segment in the opposite direction of rotation. This enables the valve body to be positioned into the other position in a reliable manner.

9 Claims, 2 Drawing Sheets

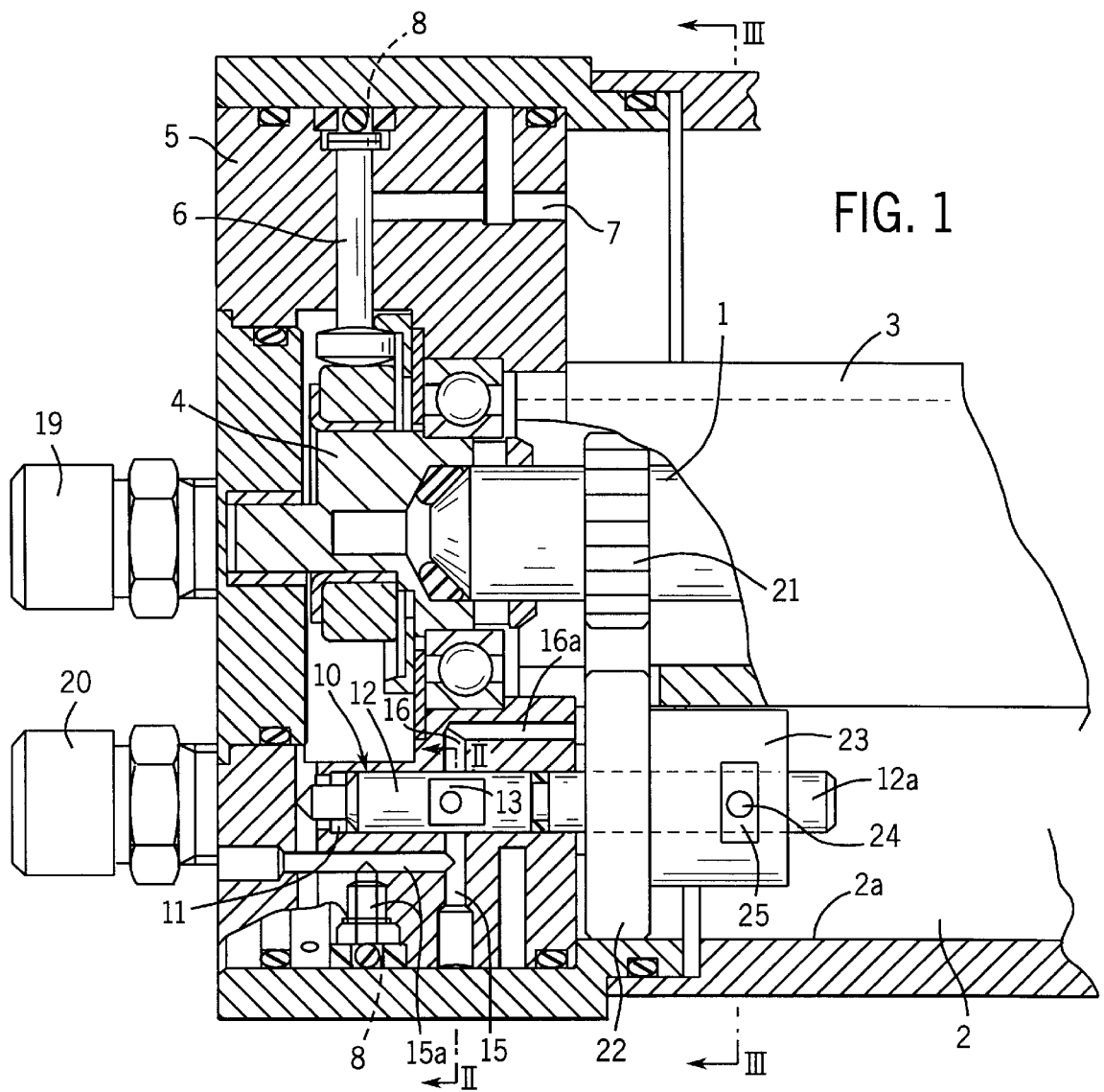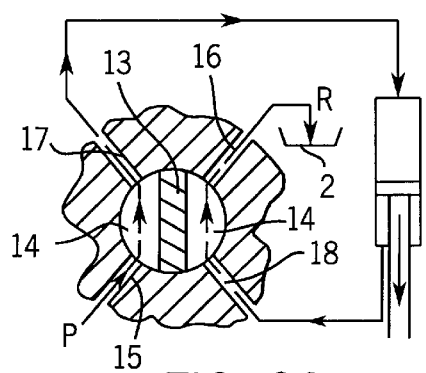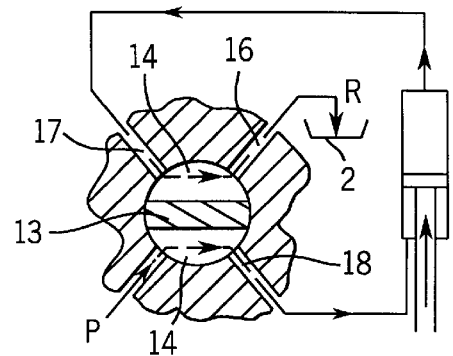

FIG. 3
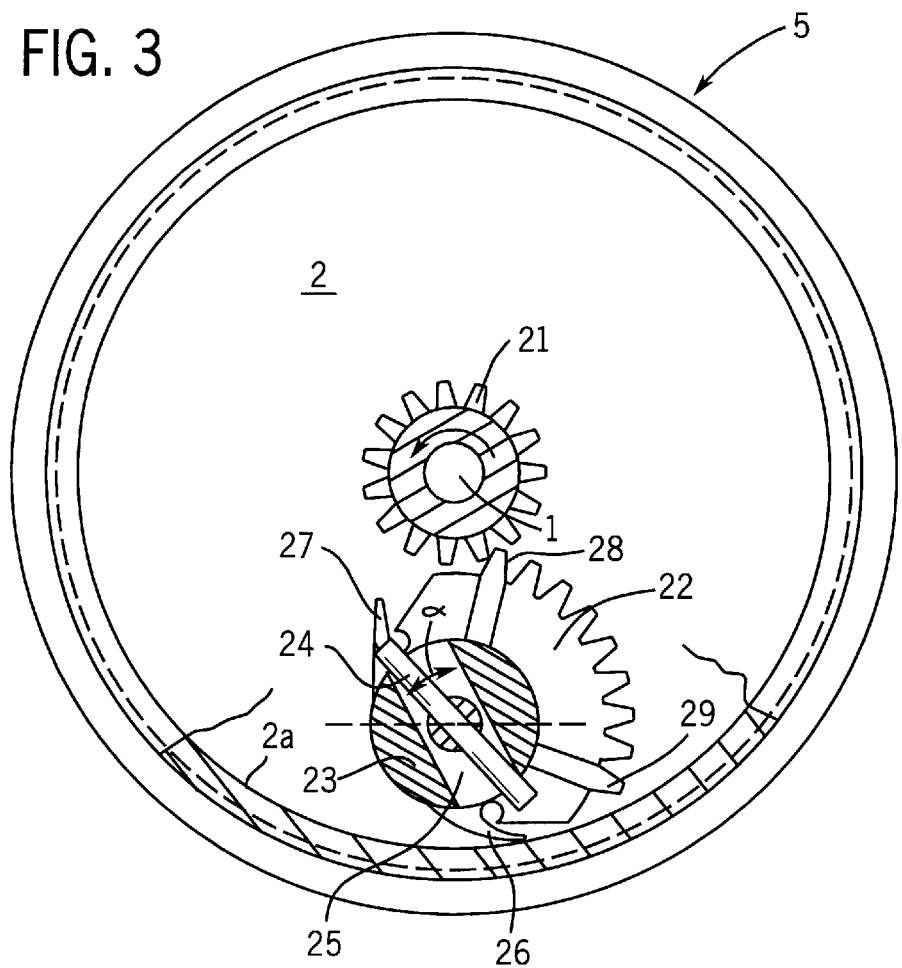
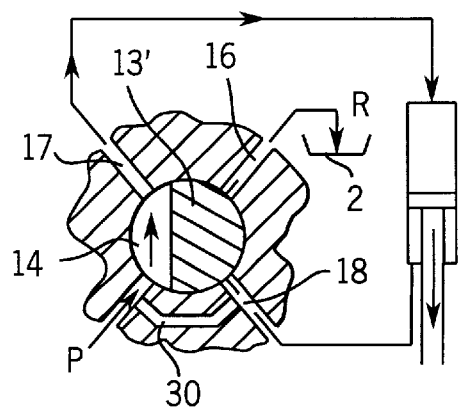
FIG. 4A
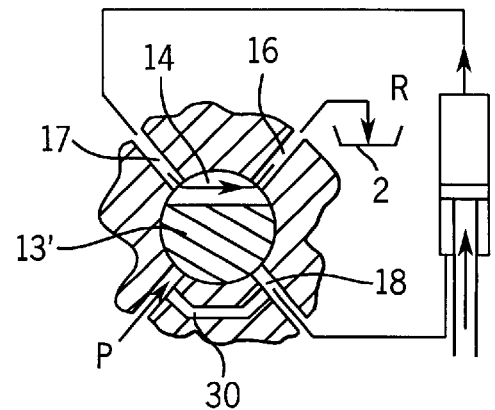
FIG. 4B

HYDRAULIC CONTROL VALVE

The present invention relates to a hydraulic control valve, comprising a two position valve body adapted to be shifted — by means of a rotary movement of an actuating shaft — from one operative position to the other.

Such control valves are commonly known. In most cases a control valve is involved, which is placed within a hydraulic circuit and comprises a housing with a pressure connection, a return connection and two service connections for a hydraulic piston cylinder device, a valve body of the rotary spool type being mounted within said housing for a manual angular movement through a limited angle. In such cases the actuating shaft coincides with the shaft of the valve body. Dependent on the actual operative position of the valve body pressurized fluid is supplied to one end of the connected hydraulic piston cylinder device, while the other end of the device is connected to the hydraulic fluid reservoir.

It is an object of the invention to provide a hydraulic valve body of the type referred to hereinabove, the valve body of which is adapted to be shifted by a shaft that may be driven in two opposite directions.

According to the invention this object is achieved in that the shaft of the valve body carries a drive wheel segment extending through an arc that corresponds to the shift angle of the valve body, said wheel segment being in drive connection with the actuating shaft, spring means being provided to bias — at least in the final stage of a rotary shift movement in either direction — said wheel segment opposite to the shift direction. At the end of a rotary shift movement, by which the valve body has moved from one position onto the other, a force is thus acting on said wheel segment in a direction opposite to the preceding rotary shift movement tending to keep said wheel in (slipping) engagement with said actuating shaft that may continue to rotate in the same direction. This secures that the wheel segment will be taken along by the actuating shaft when it is desired to reverse the shift direction so as to place the valve into the other operative position.

Preferably the wheel segment is mounted on the shaft of the valve body in such a way, that it may perform a slight lost motion round said shaft. This lost motion, which need to be a fraction of the angular shift movement only, has the advantage that the spring energy collected at the end of the preceding shift movement is completely utilized for initiating a shift movement in the opposite direction so as to cause the wheel segment to operatively engage the actuating shaft, when the direction of rotation of the latter has been reversed. Thus the first part of a shift movement is performed as a lost motion. Upon completion of said lost motion the valve body will be taken along with the wheel segment.

Such lost motion connection between the wheel segment and the shaft of the valve body is of particular advantage when the wheel segment is formed by a gear that cooperates with a gear or pinion on said actuating shaft.

The hydraulic control valve of the present invention may be advantageously applied in all of those cases, where a reversably rotating drive shaft is available.

As an example reference may be made to the hydraulic rotary piston pump disclosed in Dutch patent applications 9301011 and 9301010 (corresponding with EP-A-94201694.0 and EP-A-94201695.7). With such a pump, which is driven by an electric motor, pressure and suction connections are involved, which are independent of the direction of rotation of the pump.

The invention will be hereinafter further explained by reference to the drawing showing a preferred embodiment.

In the drawings:

FIG. 1 shows a longitudinal sectional view through the housing of a rotary piston pump, in which the hydraulic control valve of the present invention is applied;

FIG. 2A and 2B show cross-sectional views according to the line II—II of FIG. 1, in which the valve body is shown in both of its operative positions, while showing also a piston cylinder device in a diagrammatic manner;

FIG. 3 is a cross-sectional view along the line III—III of FIG. 1 and

FIG. 4A and 4B are diagrammatic cross-sectional views similar to FIG. 2A and 2B, but with the valve body designed for a regenerative made of operation of the piston cylinder device.

With the radial piston pump shown in FIG. 1 an excentric rotor 4 is driven by a drive shaft 1 that is surrounded by a bushing 3 and extends through a reservoir 2. A plurality of plunjers 6 are provided within the pump housing 5 in circumferentially spaced positions so as to be radially reciprocated by said excentric rotor. Hydraulic fluid is sucked by the reciprocating plunjers 6 via a suction passage 7 from the reservoir 2 and pressed into the circumferential passage 8.

For a more detailed description of the pump reference is made to the above mentioned patent application.

10 designates the hydraulic control valve of the invention which is provided within the pump housing 5. The control valve 10 comprises a cylindrically shaped valve body 12 that is rotatably mounted within a bore 11 and has been flatted along a short length at two site locations, thereby forming a central web 13, that separates two opposite spaces 14 (vide also FIG. 2A–B).

Four passages merge into the spaces 14 on both sides of the central web 13. These four passages comprise a passage 15 (FIG. 1), which is connected via connecting passages 15a to the circumferential pressure passage 8 of the pump, as well as a passage 16 (FIG. 1) that is connected via a connecting passage 16a to the reservoir 2, and two substantially diametrically opposite passages 17 and 18 (vide FIG. 2A–B), which are each leading, via connecting passages (not shown) extending through the pump housing 5, towards an external connection for the hydraulic piston cylinder device to be fed by the pump. These connections may be constituted by the couplings 19 and 20 shown in FIG. 1.

The valve body 12 has two operative positions, which are — in the example shown — angularly spaced thru an angle of 90°. In one position, with the central web 13 taking an upright position (vide FIG. 2A) the passage 17 is connected to the pressure passage 8 via one of said spaces 14 and the passage 15, while the other passage 18 is connected to the reservoir 2 via the second of said spaces 14 and the passage 16. In the second operative position, with the central web taking a horizontal position (vide FIG. 2B) this is just the opposite.

To shift the valve body 12, 13 from one position into the other use is made of the driving shaft 1 for the pump. For this purpose a pinion 21 is provided on the shaft 1 at a location outside the pump housing 5 but within the reservoir 2, said pinion cooperating with a gear segment 22 provided on a portion 12a of the cylindrical valve body 12 that extends into the reservoir 2.

The gear segment 22 is mounted on the extending valve body portion 12a through a hub 23. The circumferential connection between the hub 23 and the valve body portion 12a is formed by a coupling pin 24 that extends radially through said valve body portion 12a and cooperates with a diametrical recess 25 within the hub 23. The diametrical recess 25 has a width which — as seen in cross-section is larger than the diameter of the coupling pin 24, which allows the valve body portion 12a together with the coupling pin 24 to perform an angular movement in either direction through a certain clearance angle ∝ relative to the hub 23 (vide FIG. 3). In the example shown, wherein the two operative positions are angularly spaced at an angle of 90°, the toothing of the gear segment 22 covers an arc of 90+∝°.

FIG. 3 illustrates the situation, in which the gear segment 22 has been turned by the pinion 21 on the anti-clockwise rotating shaft 1 into its right-hand angular position. In that situation the valve body 12 is in one of its two working positions, e.g. the working position shown in FIG. 2A.

Furthermore FIG. 3 shows that the gear segment 22, which may be formed e.g. of plastic, is provided with two outwardly projecting lips 26 and 27 and that in the illustrated end position of the gear segment 22 the lip 26 engages the inner wall 2a of the reservoir 2 and is slightly impressed by the latter. The resiliency generated by the impression of the lip 26 tends to turn the segment 22 in the opposite position (i.e. anti-clockwise) and thereby keep the left outer tooth 28 meshing with the toothing of the pinion 21.

In the situation shown in FIG. 3, wherein the shaft 1 is rotating in the arrow direction — e.g. as long as hydraulic fluid has to be supplied to the space above the piston of the piston cylinder device in FIG. 2A — the toothing of the pinion 21 will slippingly move past the outer end of the tooth 28, due to which the latter and thereby the gear segment will be subjected to a slight vibration. Thanks the said lost motion angle ∝ between the coupling pin 24 and the diametrical recess 25, however, this vibration will not be transferred to the valve body 12. Preferably the cuter teeth 28 and 29 are formed of a softer plastic, which will reduce vibration and will cause the "beating" of the rotating toothing of the pinion 21 on the outer tooth 28 (29) to take place in a sound dampening manner.

When the valve body 12, 13 has to be shifted from the operative position shown in FIG. 2A into the operative position shown in FIG. 2B to reverse the piston motion of the piston cylinder device (upwardly in FIG. 2B instead of downwardly in FIG. 2A) such shift can be simply effected by reversing the direction of rotation of the drive shaft 1. At the of reversal the resiliency within the lip 26 will cause the tooth 28 to enter into the space between two successive teeth of the pinion 21 and thereby cause the gear segment 22 to be turned clockwise by the anti-clockwise rotating pinion 21. The initial phase of this movement will be carried out as a lost motion. Only after an initial angular movement of the gear segment 22 through an angle ∝ (which is the lost motion angle between gear segment and valve body) the valve body 12, 13 will — via the coupling pin engaging the hub 23 — be turned along to the left.

The anti-clockwise turning movement of the gear segment and the valve body will stop as soon as the second outer tooth 29 has become disengaged from the toothing of the pinion 21. At that movement the slightly trailingly directed lip 27 has already moved into contact with the wall 2a whereby a certain resiliency has been developed which tends to move the gear segment 22 clockwise again. As soon as the tooth 29 is getting disengaged from the driving tooth of the pinion 21, while tending to move back into the space behind said driving tooth under the influence of the resiliency within the lip 27, a "rap" of the next tooth of the continually rotating pinion 21 onto the segment and the valve body 12, 13 will produce a final drive impulse to the left. This will place the pinion gear segment assembly 21–29 in a situation, which is the mirror image of the situation shown in FIG. 3, while the valve body 12, 13 is taking the position shown in FIG. 2B.

In the embodiment shown in FIG. 4A and 4B the cylindrical valve body 12 is flattened on one side only. Instead of the web 13 of FIG. 2A–B a semi-cylindrical part 13' is obtained, with a space 14 on one side thereof only. As a result of this the passage 18 will — also in the first valve position (FIG. 4A) be connected to the pressure passage 15 via a by-pass 30, instead of being connected — via the passage 16 — to the reservoir as is the case in FIG. 2A. In the position shown in FIG. 4A fluid pressure is supplied to both of the cylinder ends, which means that a regenerative mode of operation of the piston cylinder device is involved.

The invention is not limited to the example described herein-above and shown in the accompanying drawing. The hydraulic control valve of the present invention may be advantageously applied in cases, where a reversible drive shaft is available in a reversible hydraulic system. According to the invention such a drive shaft will then be utilized for shifting a hydraulic control valve to thereby reverse the direction of operation in the hydraulic system.

We claim:
1. In combination:
   a drive shaft mounted for continuous rotary movement by a reversible motor;
   a drive wheel fixedly mounted on said drive shaft;
   a hydraulic control valve having a rotary valve body adapted to be angularly shifted between two operative positions;
   a drive wheel segment extending through an arc that corresponds with the shift angle of said valve body, said wheel segment being connected to said valve body and mounted for circumferential engagement with and rotational driving movement by said drive wheel so as to cause said valve body to angularly shift from one position to the other, the connection between said valve body and said wheel segment being an angular lost-motion connection, the extent of which is a fraction of said shift angle; and
   biasing means which cause said wheel segment, after said wheel segment is rotated by said drive wheel through said shift angle in one driving direction to rotate said valve body to one of said positions, to turn in a direction opposite to said one driving direction and thereby be kept slippingly engaged with said drive wheel while said drive wheel continues to rotate so that said wheel segment is biased to become drivingly engaged with said drive wheel when said drive wheel reverses direction.

2. A combination according to claim 1, characterized in that the wheel segment is formed as a gear segment that cooperates with a gear or pinion on said drive shaft.

3. A combination according to claim 2, characterized in that the pinion and the gear segment are formed of plastics material.

4. A combination according to claim 3, characterized in that outer teeth of the gear segment are formed of a softer plastics material.

5. A combination according to claim 3, characterized in that said spring means are constituted by lips which extend from a non-toothed core portion of the gear segment outwardly and are each adapted to engage, while deforming elastically, a surrounding wall in a respective end position of the valve body.

6. A combination according to claim 5, characterized in that the surrounding wall constitutes a circumferential wall of a fluid reservoir of a hydraulic pump, said drive shaft extends through the reservoir to actuate said hydraulic valve, and said rotary valve body is mounted within the housing of said pump and is provided with an extension that carries the gear segment and extends into the reservoir.

7. A hydraulic control valve, comprising a two position valve body adapted to be shifted, by means of a rotary movement of an actuating shaft, from one operative position to the other, characterized in that the shaft of the valve body carries a gear segment extending through an arc that corresponds to the shift angle of the valve body, said gear segment being in drive connection with a gear or pinion on the actuating shaft, biasing means being provided to bias, at least in the final stage of a rotary shift movement in either direction, said gear segment in a direction opposite to the shift direction, and wherein outer teeth of said gear segment are formed of a softer material than inner teeth of said gear segment.

8. A hydraulic control valve, comprising a two position valve body adapted to be shifted, by means of a rotary movement of an actuating shaft, from one operative position to the other, characterized in that the shaft of the valve body carries a gear segment extending through an arc that corresponds to the shift angle of the valve body, said gear segment being in drive connection with a gear or pinion on the actuating shaft, biasing means being provided to bias, at least in the final stage of a rotary shift movement in either direction, said gear segment in a direction opposite to the shift direction, wherein said biasing means are constituted by lips which extend from a non-toothed core portion of the gear segment outwardly and are each adapted to engage, while deforming elastically, a surrounding wall in a respective end position of the valve body.

9. A hydraulic control valve according to claim 8, characterized in that the surrounding wall constitutes a circumferential wall of a fluid reservoir of a hydraulic pump, a reversible drive shaft of which extends through the reservoir to function as an actuating shaft for the hydraulic valve, the control valve body being mounted within the housing of said pump and being provided with an extension that carries the gear segment and extends into the reservoir.

* * * * *